United States Patent [19]

Kiedrowski

[11] Patent Number: 4,754,180

[45] Date of Patent: Jun. 28, 1988

[54] FORCELESS NON-CONTACTING POWER TRANSFORMER

[75] Inventor: James A. Kiedrowski, Phoenix, Ariz.

[73] Assignee: Honeywell Inc., Minneapolis, Minn.

[21] Appl. No.: 917,243

[22] Filed: Oct. 7, 1986

Related U.S. Application Data

[63] Continuation-in-part of Ser. No. 718,149, Apr. 1, 1985.

[51] Int. Cl.4 .................... F16C 39/06; H01F 15/02

[52] U.S. Cl. .................... 310/90.5; 336/83; 336/120; 336/121; 336/123

[58] Field of Search .................... 336/30, 120, 121, 123, 336/117, 118, 119, 135, 65, 192, 83, 105, 107; 310/90.5

[56] References Cited

U.S. PATENT DOCUMENTS 3,213,398 10/1965 Marton .................... 336/192 X
3,946,349 3/1976 Haldeman, III .................... 336/62
4,117,436 9/1978 MacLennan .................... 336/65
4,321,572 3/1982 Studer et al. .................... 336/83

*Primary Examiner*—Thomas J. Kozma
*Attorney, Agent, or Firm*—Arnold L. Albin

[57] ABSTRACT

A transformer for coupling electrical power from a stationary location to a moving location with a minimum of disturbance forces between the stationary and moveable components. The transformer is particularly adapted to coupling power to a magnetically suspended platform. The transformer includes an enclosed core housing two windings, a stationary primary coil, and a secondary coil free to move linearly and angularly over a limited displacement, where the secondary coil is affixed to the moveable platform, thereby enabling energy to be extracted for powering apparatus mounted within the platform.

4 Claims, 5 Drawing Sheets

FORCELESS NON-CONTACTING POWER TRANSFORMER

This is a continuation-in-part of co-pending application Ser. No. 718,149, filed on Apr. 1, 1985.

BACKGROUND OF THE INVENTION

1. Field of the Invention

The invention relates generally to inductive coupling, and more particularly to transformers where there is relative motion between the primary and secondary winding and minimal reaction forces therebetween.

2. Description of the Prior Art

The invention described herein has particular utility in applications where electrical power is coupled from a stationary location to a moving location with a minimum of interaction between the stationary and moveable components. The invention is principally applied to transfer power across magnetically suspended interfaces, where small disturbance forces might impact the magnetic control forces, and where motions over as many as six degrees of freedom are required over a limited range.

Known technologies for coupling electro-magnetic energy across a moving boundary or interface consist of solenoid and rotary transformer type structures. In U.S. Pat. No. 4,117,436, Torqueless Relatively Moving Transformer Windings, issued to A. G. MacLennan, a transformer comprised of primary and secondary windings axially disposed on a common axis and surrounded by a core of high permeability material is adapted to provide limited relative rotary motion between first and second transformer windings about the axis. The disadvantage of this device is the limited range of freedom of relative motion. Another structure is shown in U.S. Pat. No. 4,321,572, issued Mar. 23, 1982 to P. A. Studer. In the Studer structure, a rotary transformer has a fixed primary winding and a secondary winding rotatable through a gap in the core structure. The invention principally allows full rotational freedom without allowance for motion about other axes. However, the presence of the air gaps in the core of Studer's invention deteriorates electrical performance by greatly reducing the magnetizing inductance in relation to the leakage inductance, thereby requiring larger excitation currents and volume to perform a given power transfer, resulting in reduced efficiency.

The present invention improves over the prior art by providing a non-contacting structure that allows motion over six degrees of freedom, provides insignificant reaction forces with respect to the actual control forces applied to a stabilized structure attached thereto, requires no air gap in the core, and provides high efficiency over the required range of motion.

SUMMARY OF THE INVENTION

The present invention provides an apparatus for coupling electrical power and optical control signals to a magnetically levitated platform. Electrical power is coupled by a power transformer having an enclosed magnetic core substantially witout air gaps, a primary winding fixed within the core, and a secondary winding disposed within the primary winding in a manner to permit relative motion between the first and second windings. The movable second winding is positioned with respect to the first winding to provide directional freedom of motion radially, axially, rotationally, and in tilt. The arrangement provides substantially constant flux coupling between the two windings over the range of motion of the secondary, thereby rendering the transformer free from inductive reaction torques. Optical control signals are coupled through an axial bore in the transformer core. The transformer secondary is coupled to the levitated platform of a magnetic bearing assembly to permit power transfer between the stationary base and the movable platform. By proportioning the axial dimensions so that the secondary electrical winding is free to move over at least a distance of 3 times the required axial displacement, and the radial dimensions so that the secondary electrical winding is free to move over a distance at least 1.5 times the required radial displacement, the secondary winding is effectively operative within a zone of uniform flux linkages wherein the axial and radial reaction forces are of negligible magnitude. By maintaining the axial bore of the transformer core free from supporting members and conductive elements, it may be used effectively to couple optical control signals between the stationary and levitated portions of the platform.

BRIEF DESCRIPTION OF THE DRAWINGS

FIG. 7 is a cross-sectional view of an inductive coupler of the present invention, showing a dimensional configuration.

DESCRIPTION OF THE PREFERRED EMBODIMENT

As above indicated, the transformer of the present invention is particularly adapted for use with a magnetically suspended interface where power must be transferred to a suspended payload with a minimum of interaction with the suspension system. This is particularly critical where the suspension system is of the magnetic type. It is highly desirable to provide complete freedom of movement, albeit over a limited range, and to reduce any mechanical forces and electrical disturbances which may interact with the suspension system. Inductive coupling reduces friction losses because it eliminates sliprings and brushes or flexible wires and the like which increase the friction and reaction forces imposed upon the suspension system.

Furthermore, substantial power must be transferred with high efficiency, since it is intended for a space-environment application where heat dissipation is critical.

Figure 1C:
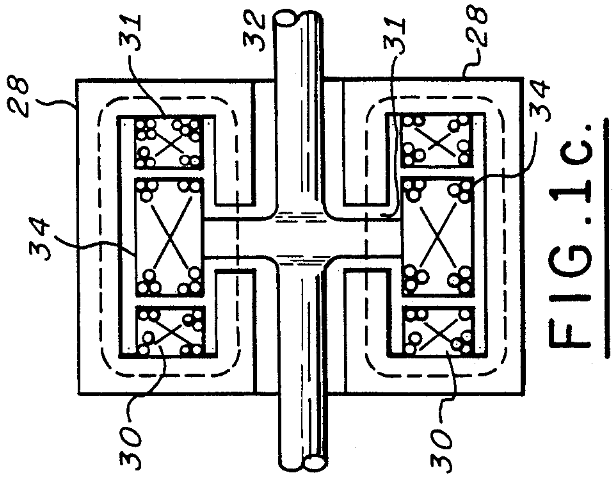
FIG. 1C is a cross-sectional view of a rotary transformer with a stationary core and rotatable second winding.
Figure 1B:
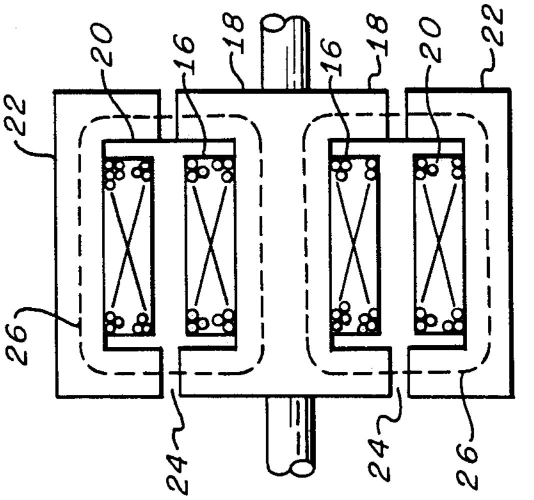
FIG. 1B is a cross-sectional view of a rotary transformer with a rotatable core and secondary winding.
Figure 1D:
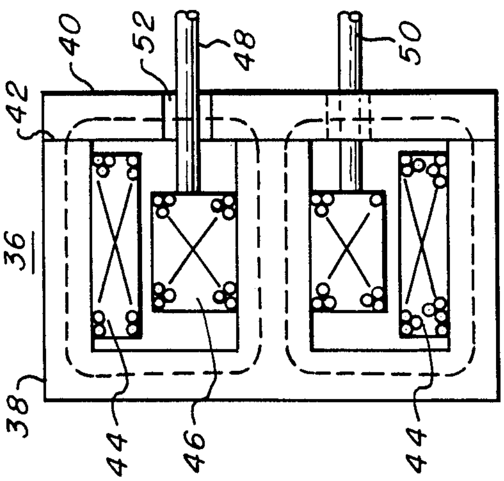
FIG. 1D is a cross-sectional view of the present invention showing a stationary core and movable secondary winding.
Figure 1A:
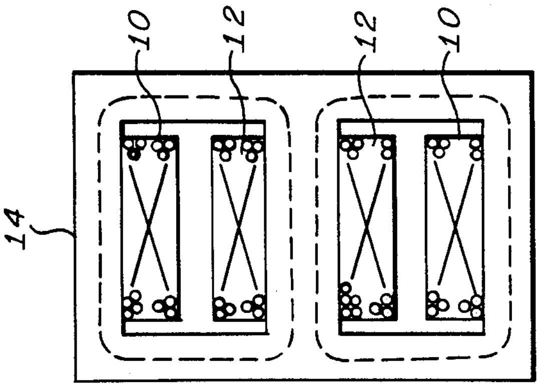
FIG. 1A is a cross-sectional view of a conventional stationary transformer.

Referring now to FIG. 1A, a conventional two-winding transformer is shown. A primary coil 10 and a secondary coil 12 are enclosed in a magnetically permeable core 14 such that a magnetic circuit is formed coupling the primary and secondary coils through the core. All parts are stationary with respect to each other and no air gap is required in the magnetic path of the core. Such a transformer may be constructed with a cubic volume or a cylindrical volume depending on whether the core is to be constructed of laminated material or a cast material such as a ferrite.

FIG. 1B shows a conventional rotary transformer constructed from a cyclindrical volume concept wherein one coil 16 and part of the magnetic core 18 rotate and one coil 20 and part of the core 22 are stationary. Air gaps 24 in the core allow rotary motion of the secondary with single-axis rotational freedom. The flux path 26 across the gaps causes significant disturbing forces when the rotor is moved from its centered location. This device is of the type described by Braddon in U.S. Pat. No. 2,432,982, issued Dec. 23, 1947 and assigned to the assignee of the present invention.

A further improvement is described in FIG. 1C, representative of the Studer patent. In Studer, a magnetic core 28 surrounds a stationary winding 30 and 31 affixed thereto with an air gap 32 in the core disposed to permit single-axis rotational movement of a second winding 34. Only the secondary coil is moveable and no core material is contained therein. The primary coils 30 and 31 and the iron core 28 remain stationary. Gap 32 is located internally in a channel extending traversely of an axial bore, thereby isolating the gap 32 from free space and reducing extraneous flux leakage. The coreless secondary requires no relative motion of flux transfer between moving core paths and thus generates significantly lower forces on the moving body than the device of FIG. 1B. However, the core gap 32 inhibits the electrical performance as described above. Additionally by isolating the core gap 32 within the axial bore eliminates other uses for the axial bore. For example, as discussed hereinafter, it may be necessary to place an optical coupler on the transformer centerline to transfer data between stationary and rotating parts of a system.

In the MacLennon transformer of U.S. Pat. No. 4,117,436, the primary and secondary coils are axially aligned on a spindle to permit a limited range of single axis rotary motion. However, none of the structures shown in MacLennon permit the six degrees of freedom provided by the present invention.

FIG. 1D is a cross-sectional view of the present invention. A magnetic core 36 is comprised of an annular cup-shaped housing 38 and a cover plate 40 with no air gap at the interface 42. A primary coil 44 is stationary within the core 38. A secondary coil 46 is positioned to allow free motion in all directions over a limited range. Secondary coil 46 supports structural members 48 and 50 affixed thereto with clearance holes 52 bored in the cover plate 40 in a manner which does not interrupt the magnetic circuit.

Since there is no magnetic material in the secondary coil, reluctance forces, which are those forces caused by magnetic flux crossing between iron sections separated by a gap, are eliminated. The reluctance force is the principal undesirable force contributor in the prior art and its elimination enables a substantially better performing device.

The next significant undesirable force contributor is the interaction of the primary and secondary leakage fields in the coil space. When the secondary coil is centered in the coil space, a symmetrically force balanced condition exists and no net force is exerted on the secondary coil. However, when the secondary coil is translated either radially or axially, an undesirable force is exerted on the secondary coil with its magnitude proportional to the displacement. Since these undesirable forces are a function of the uniformity of the leakage fields, they can be further reduced by increasing the mechanical clearance around the secondary coil to be greater than the desired coil motion, as is explained below with reference to FIG. 6.

Figure 6:
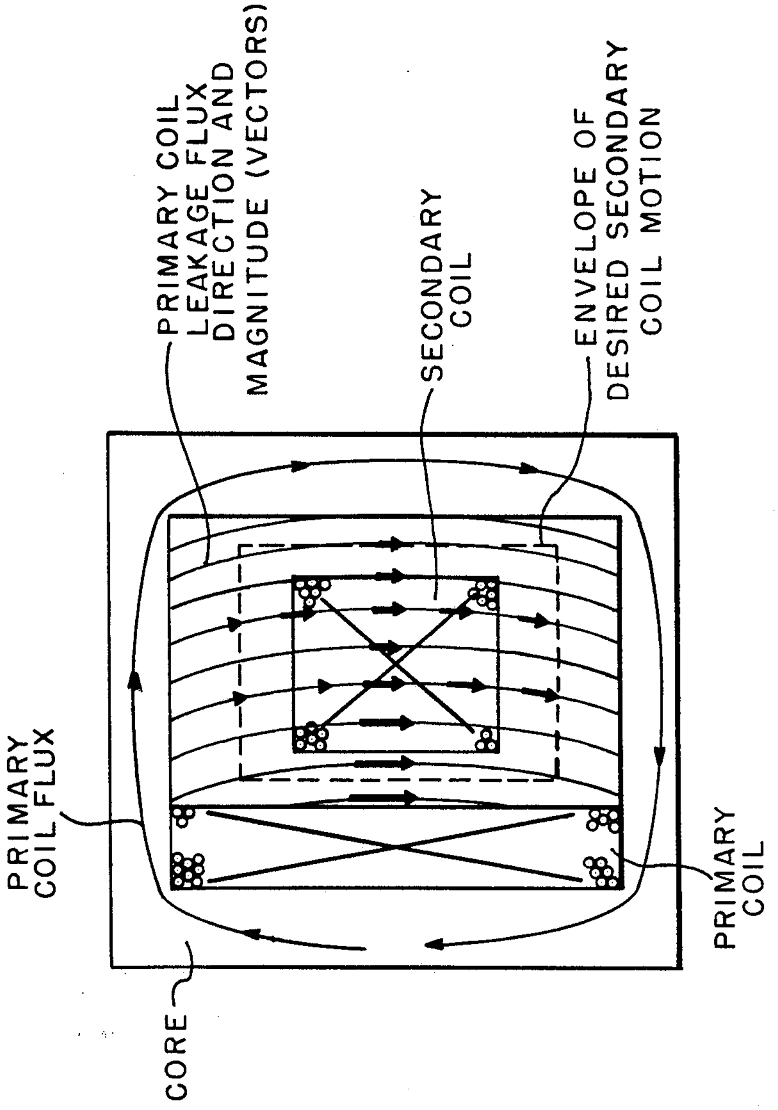
FIG. 6 is a cross-sectional view of a flux leakage pattern, useful in understanding the present invention.

The undesirable forces on the secondary coil are due to the interaction of the primary and secondary flux leakage fields in the coil space. These undesirable forces can be further reduced by attention to the primary coil leakage field uniformity throughout the space to be occupied by the secondary coil. FIG. 6 depicts the primary coil leakage flux in the tranformer coil space in both direction and magnitude; also showing the envelope of the desired secondary coil motion. When the transformer is energized and loaded, magnetic fields are established in and around the two windings. If the secondary winding is not centrally disposed, the fields interact to produce forces on the windings tending to restore the secondary to the centered position. If the primary leakage field were perfectly uniform in magnitude and direction over the desired secondary coil motion, no forces would exist. However, it is seen from the Figure that the leakage field is strong at the primary coil and weak at the point farthest from the primary coil. One method to improve the leakage field uniformity in the range of motion of the secondary coil and hence to reduce the forces is to enlarge the mechanical clearances so as to be substantially greater than the desired motion of the secondary coil. The coil clearances were determined as a trade-off between coil areas, clearance space allocations, and overall transformer size and weight. Disturbance forces are generated whenever the movable coil is asymmetrically displaced, and are proportional to the displacement of the windings and the products of the current values in the windings. The direction of the forces generated is always in a direction to oppose the relative motion between the coils.

In the preferred embodiment, it was desired to obtain disturbance forces that did not exceed 0.0077 $lb_F$ (pounds of force) axially for $\pm 0.22$ inch displacement, 0.0032 $lb_F$ radially for $\pm 0.20$ inch displacement, and a range of motion in tilt of $\pm 0.75°$. Force calculations with the configuration shown in FIG. 7 and vector diagrams of calculated flux patterns indicated that reaction torques would be within the specified levels if the leakage flux were maintained substantially constant (i.e., within $+20\%$) over the displacement of the secondary winding. These calculations indicated that a radial clearance of 0.3 in (about 1.5 times the required motion) and an axial clearance of 0.65 in (3 times the required motion) would satisfy the design requirements. It is clear from the above that the force levels were most sensitive to axial coil clearances. Thus, by properly sizing the secondary coil to core clearances, the displacement torques may be limited within the prescribed range.

Figure 2:
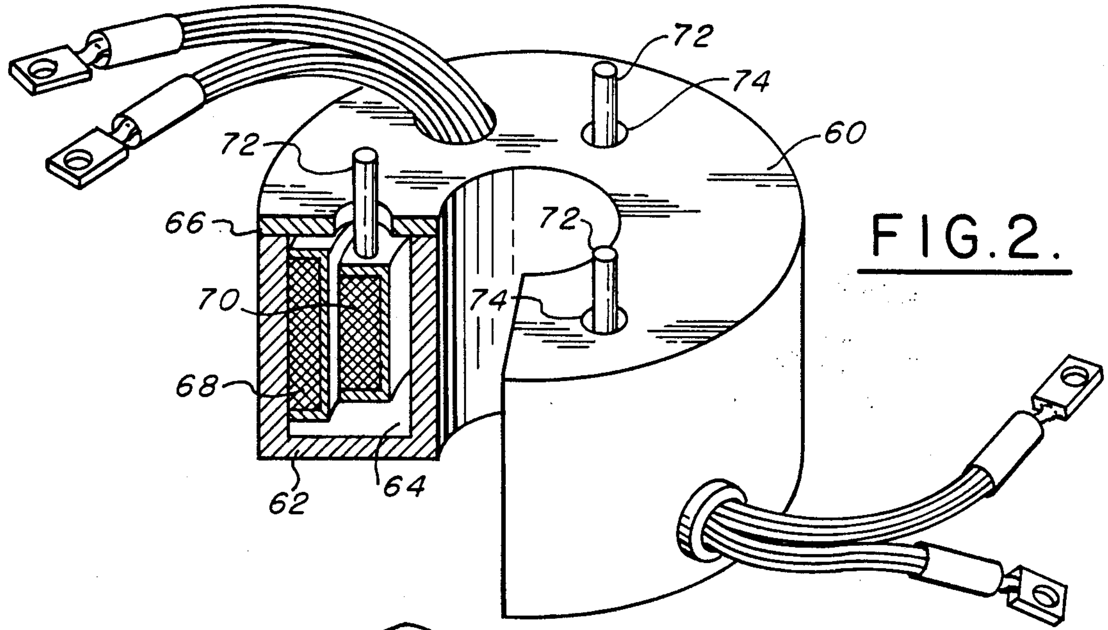
FIG. 2 is a perspective view in cross-section of the core and coil structure of the present invention.

FIG. 2 is a perspective view of a preferred embodiment of the invention with a section removed to depict the principal components and their relative positions within the apparatus. The configuration shown is exemplary and not to be construed as limiting. Thus, for example, positioning of the supports, etc., plays no part in the efficacy of the present invention and may not be required with other mounting arrangements. Other coils disposition, such as providing a fixed winding on the inner annular wall of core 60, are also useful.

A closed core 60 may be comprised of a magnetically permeable annular ring 62 having a cavity 64 and a cover plate 66. The core is so contructed and arranged that no air gap is permitted at the interface with the cover plate. A first winding 68 which may comprise a primary winding for accepting electrical energy is fixedly disposed in the cavity 64 and in stationary contact with the core 62. Positioned within the cavity 64 and radially spaced from the primary winding 68 is a second electrical winding 70 which may comprise a secondary winding for delivery electrical power transferred by inductive coupling to load, not shown. It may be seen that the core 60, the first winding 68, and the second winding 70 comprise a magnetic circuit and that the second winding is positioned for free movement with respect to the core and first winding, while maintaining substantially constant flux coupling independent of the positional relationship with respect to the first winding.

The closed core 60, which may be comprised of a ceramic based ferrite material, such as a manganese zinc ferrite, designated as MN60, as manufactured by Ceramic Magnetics Corp., 87 Fairfield Road, Fairfield, N.J. 07006, together with the primary coil 68, may be attached to a mounting base and power source, not shown. The secondary coil 70 maintains at least a predetermined clearance from the primary coil 68 and the walls of core 62 to minimize the reaction forces noted above, by assuring operation when the secondary is confined with a region of substantially uniform flux linkages, and is attached by supports 72 to the payload or moving element. The secondary winding 70 is located within the annular cavity 64 bounded by the walls of magnetically permeable core 62 and the primary coil 68. The closed magnetic core 60 surrounds both the primary coil 68 and the secondary coil 70 with no air gap to provide a closed path magnetic cirucit coupling the flux from the primary coil to the secondary coil. A cylindrical core with an axial through bore is shown, but this is exemplary, and other shapes, such as a solid cylindrical core or a rectangular core, may also be utilized.

A plurality of apertures 74 is provided for receiving the structural supports 72 with clearance to allow free motion of the secondary coil 70.

Figure 3:
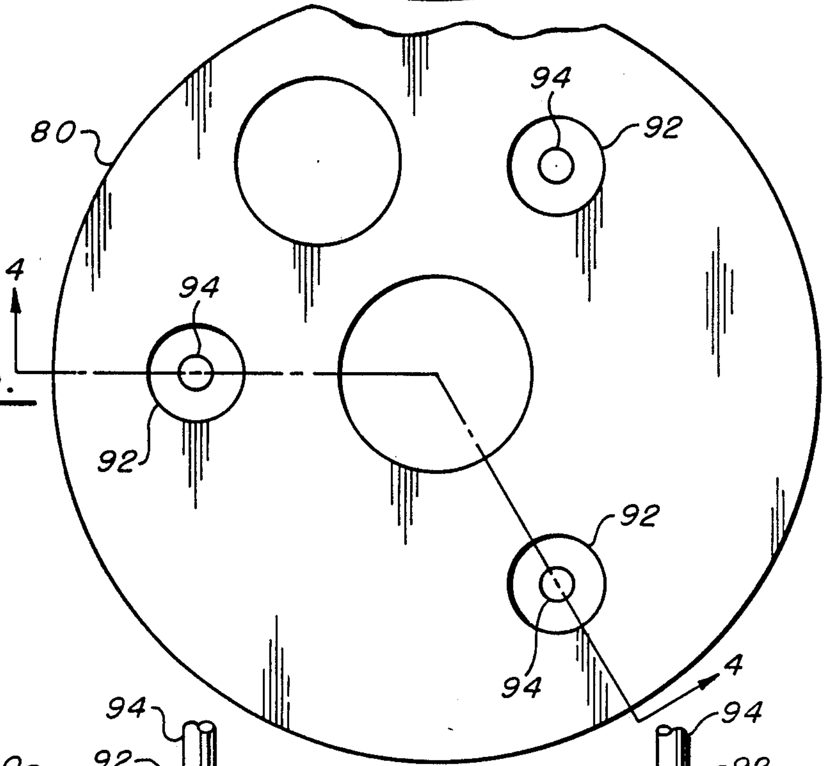
FIG. 3 is a plan view of the present invention.
Figure 4:
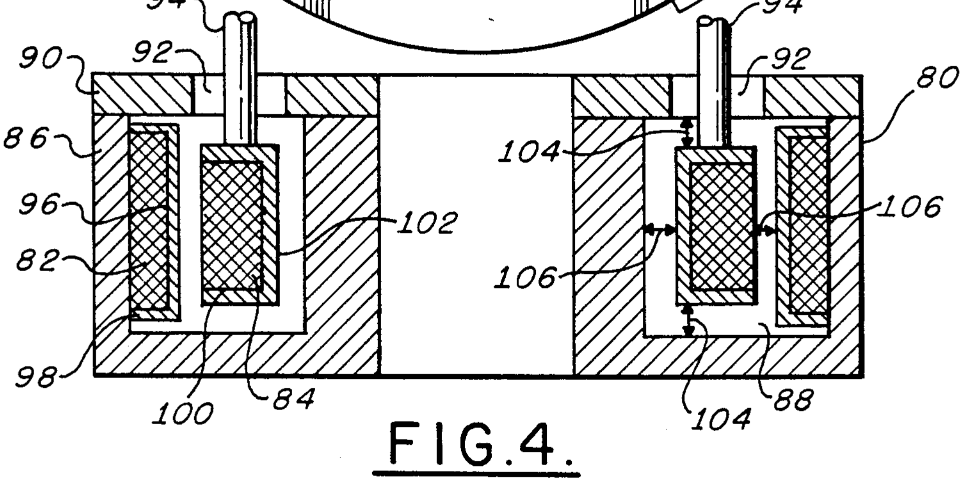
FIG. 4 is a cross-sectional view of the present invention taken along line 4—4 of FIG. 3.

Referring now to FIG. 3 as well as to FIG. 4, in which like reference numerals indicate like components with respect to FIG. 3, the magnetically permeable core 80 is made up of two or more components to allow the primary coil 82 and the secondary coil 84 to be assembled into the enclosed core. The core illustrated is comprised of a cup 86 having an essentially cylindrical body with an annular cavity 88 into which the primary coil 82 and the secondary coil 84 are placed. The primary coil 82 is affixed to the outer peripheral wall of the cup 86. An end plate 90 is placed in contact with the core 86 to provide an essentially gapless magnetic circuit. The core assembly 80 is comprised of a highly magnetic permeable material and must be machined to a close tolerance so that no air gap will be allowed in the magnetic circuit. The end plate 90 is provided with apertures 92 through which supports 94, which are fixed to the secondary coil, may extend. In order to assure no disturbance of the magnetic field, the supports 94 must be formed of a nonmagnetic material. The supports, in turn, will be coupled to a supporting structure, not shown, on which is mounted a payload for receiving the coupler power.

The primary coil 82 is comprised of a toroidal winding of magnet wire 96 wound on an insulating bobbin 98. While the winding of FIG. 4 is a single toroidal coil, the winding may also be comprised of several individual coils connected in series and disposed within the cavity 88.

For most efficient preformance, the core must be operated well below saturation. Typically, an average flux density of about 900 Gauss is obtained with the windings described below at a power level of 2500 Watts output. The outer cylindrical wall of the core is sized for the minimum practical dimension that will provide adequate mechanical strength (0.25 in) while remaining below saturation flux density, and the end-plates and inner cylindrical wall are sized to provide a cross-sectional area substantially equal to the outer wall (say, within 50%), thus maintaining relatively uniform flux density. The cross-sectional area is herein defined as the product of the average circumference of the member and the wall thickness. Since the material specified can be operated at well over 3,000 Gauss, it is operating substantially within a linear region of the magnetization curve.

The secondary coil 84 is a further toroidal winding of magnet wire 100 on a bobbin 102. Bobbin 102 is also formed from an insulating material, such as phenolic plastic. Coil 84 is proportioned to provide mechanical clearance 104 in the vertical direction and clearance 106 in a horizontal direction to allow the desired freedom of motion in axial, radial, and angular directions. Preferably, the mechanical clearances will by substantially greater than the desired range of motion of the secondary coil 84 to minimize the effects of magnetic disturbance forces on the sturcture to which the coil is coupled. Typically, the transformer will provide free movement of 0.05 to 0.50 inch over six degrees of freedom. It will be clear that while the supports 94 are shown extended through the end plate 90, apertures may alternatively be provided in the base of the core or the sidewalls with appropriate clearances for the primary coil.

Referring now to FIG. 7, there is shown the detailed construction and dimensional parameters of a forceless transformer of the type herein described. The core is comprised of outer cylindrical rings 203 and 205 and inner cylindrical rings 204 and 206, which are stacked to a depth of 2.30 in. A top or cover plate 200 and bottom plate 202 complete the core assembly. Rings 203 and 205 have a wall diameter of 0.25 in., while rings 204 and 206 have a wall diameter of 0.625 in. Plates 200 and 202 are 0.35 in. thick. The outer ring walls are chosen to provide adequate structural strength and a low flux density. The inner rings and top and bottom plates have thicknesses chosen to provide a flux density substantially equal to that in the outer ring.

A primary coil 208 is placed radially within cavity 214, adjoining rings 203 and 205, and extends coaxially coincident with the ring depth of 2.30 in. A secondary coil 210 is suspended, when energized, within cavity 214 and affixed to support posts 216 for levitating a support platform (not shown). Coil 210 has a height of 1.0 in and a depth of 0.825 in. This results in an axial clearance of +0.65 in, −0.65 in, which is approximately three times the required axial deflection of +0.22 in and a radial clearance of +0.30 in, which is 1.5 times the required radial deflection of 0.20 in. It may be shown that these clearances will be sufficient to support the required range of tilt of ±0.75°. An axial bore 212 is provided for transmitting optical signals through the transformer core, since the inner walls 205 and 206 have been sized to provide a sufficiently low flux density to maintain linearity without the need for the additional cross-sectional area of the centrally disposed section of the core.

In a preferred embodiment, wherein the exciting current was applied at an audio frequency of about 10 kHz, the inductive coupler comprises a transformer, wherein the primary coil was wound of seven turns of 525 strands of number 33 AWG insulated copper wire electrically connected in parallel, of the type known as Litz wire to reduce skin effect, and the secondary was wound of two turns of a total of 1750 strands of number 33 AWG Litz wire. Litz wire is a construction wherein each coil is wound with a conductor comprised of a plurality of conductive strands so symmetrically disposed that each strand assumes, to substantially the same extent, a plurality of different possible positions in the cross-section of the conductor, for providing a substantially uniform distribution of current over the cross-section when operative at alternating frequencies. Litz wire is commonly used for radio frequency applications (e.g. hundreds of kilohertz), but is now known to have been applied for transformer operation at audio frequencies (e.g., 10–20 KHz) or for power transfer, because the corresponding dc resistance values increase as the result of the reduced copper cross-section, which may be as great as a factor of 2:1. However, at an operating frequency of 10 KHz, the use of Litz wire was found to result in a 37% power saving over the equivalent volume of solid conductors. The core was fabricated of manganese-zinc ferrite material using flat upper and lower plates and inner and outer rings to form the core. The coil bobbins were machined from cloth-reinforced phenolic plastic with a wall thickness of 0.075 to 0.125 inch. The transformer leads were terminated at six inches from the transformer body with brass lugs to serve as electrical interfaces to the input and output circuits.

The model described above, designed for a 2500 watt power transformer, exhibited power output substantially independent of the platform displacement with a power transfer efficiency of 99.3%. Secondary coil disturbance forces were about 0.006 lb-ft axial and less than 0.003 lb-ft radial. Motion capability was provided of ±0.22 axial, ±0.20 radial, and ±0.75° tilt.

Figure 5:
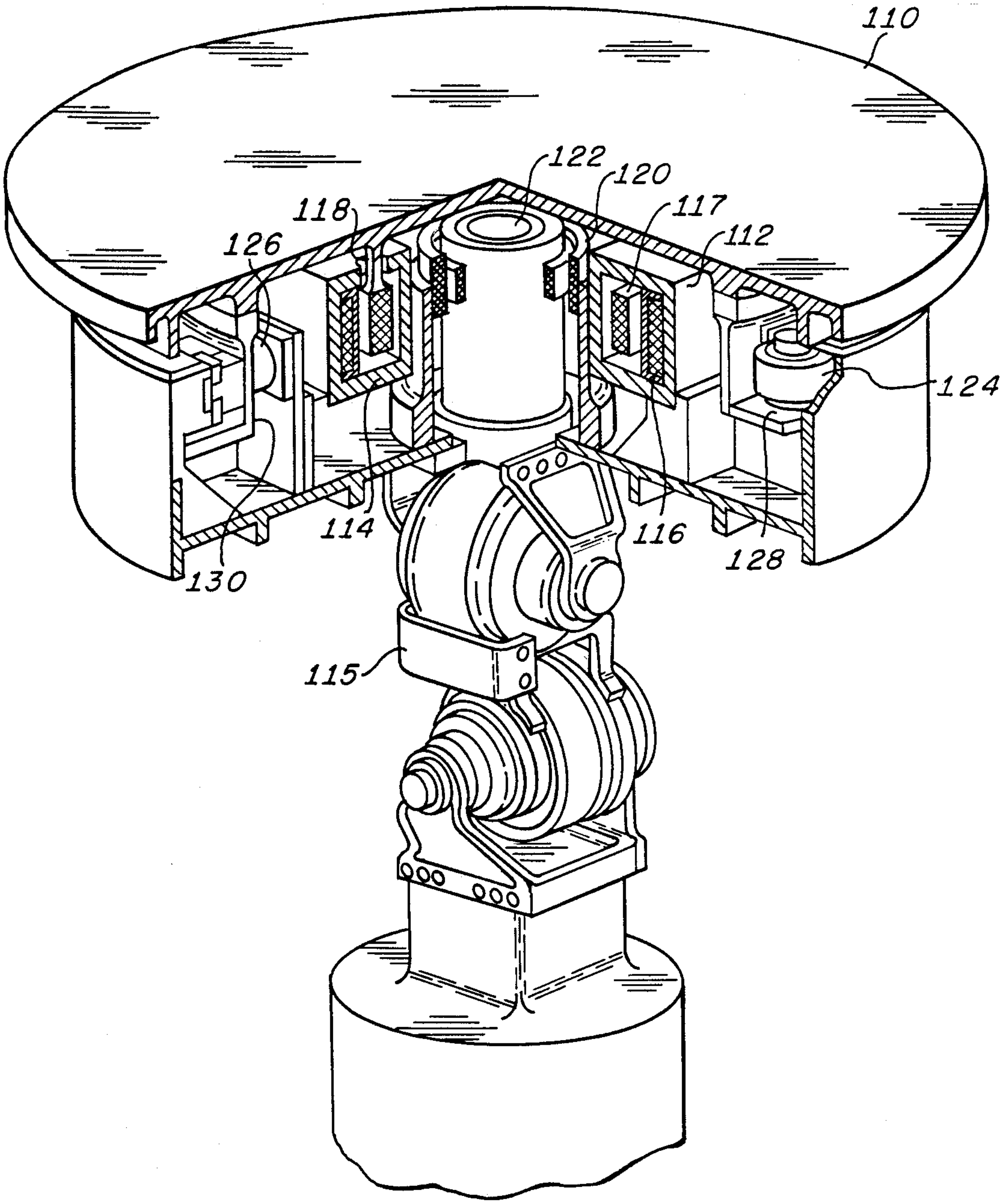
FIG. 5 is a conceptual perspective view of a magnetic suspension system having an inductive coupler as in the present invention, taken in partial cross-section.

FIG. 5 shows a magnetically suspended moveable platform for a precision pointing mount, including an inductive coupler 112 of the present invention. A toroidal core 114 has an annular chamber, with a primary winding 116 fixedly mounted therein which is energized by a power source, not shown, coupled to the mount 115. A movable secondary winding 117 is enclosed within the core and affixed to the platform 110 via non-magnetic supports 118. The secondary winding is coupled to energize a payload (not shown), such as optical instruments or an antenna which is mounted on the platform 110, thereby avoiding the use of slip rings or flexible cables. Payload data signals are transmitted through the transformer axial bore via an optical coupler (not shown), housed within an axial enclosure 122 in the mount. The transformer through hole allows integration with the optical coupler since it requires operation on the center line of rotation. The enclosed core 114 enables positioning the transformer in close proximity to the magnetic bearing assemblies 124 and 126 without imposing undesirable disturbances therebetween due to the flux leakage.

The platform 110 is magnetically supported and oriented to provide six degrees of freedom by magnetic bearing assemblies 124 and 126 cooperating with armatures 128 and 130, respectively, which support the platform. Since the required range of movement is limited, the clearance between the secondary coil and the core primary winding are made sufficiently large that the force versus displacement characteristics, which are a function of the displacement, provide substantially reduced mechanical forces imposed on the moveable platform as a result of energizing the primary winding and withdrawing energy from the secondary winding.

Referring again to FIG. 4, in operation the winding 82 is energized by an AC current supply to set up an alternately reversing flux as shown by the flux path 108. Since the flux path is substantially contained within the core 80 and completely surrounds the secondary winding 84, and induced voltage is provided in winding 84 which is independent of its physical displacement with respect to the primary windings 82. Since all of the core material remains fixed during the motion of the secondary coil, there is no magnetic force interaction between permeable magnetic surfaces. Thus, there is provided an essentially forceless restraint of the movement of the secondary windings. The secondary coil 84 is free to move throughout the mechanical clearances 104, 106 without significant change in the efficiency of energy transformation. In contrast with the prior art apparatus which utilized a magnetic circuit which provided an airgap for free rotation of one of the magnetic elements, the present invention employs a magnetic circuit with no air gaps, which results in limited leakage flux and minimizing electromagnetic disturbances. Further, since the movable portion of the transformer contains no permeable materials it is substantially independent of disturbance forces.

While the invention has been described in its preferred embodiments, it is to be understood that the words which have been used are words of description rather than limitation and that changes may be made within the purview of the appended claims without departing from the true scope and spirit of the invention in its broader aspects.

What is claimed is:

1. A magnetically suspended platform including means for coupling electrical power and optical control signals to the platform free from inductive reaction torques comprising:

a support base, a magnetic bearing assembly mounted on said base having a movable armature of magnetically permeable material coupled to support said platform, and to provide axial, radial, angular, and rotational displacement thereof, inductive coupler means having a first winding for energization by a source of electrical power and a second winding for coupling at least a portion of said electrical power to said platform, an enclosed toroidal core of magnetically permeable material, said core having a base centrally disposed on said support base and defining a magnetic flux path substantially free of air gaps, having an axial bore free of conducting members, for propagating said optical control signals therethrough, and further defining an annular chamber for receiving said first and second annular electrical windings, said chamber having a first axial dimension and first and second radial dimensions, said first radial dimension defining an inner wall of said chamber and said second radial dimension defining an outer wall of said chamber, said first electrical winding positioned coaxially in stationary contact with said magnetic core on said outer wall and having a second axial dimension coincident with said first axial dimension and defining a second radial dimension with respect to said chamber, said second electrical winding positioned raidally and axially within at least a portion of said first winding, having a third axial dimension and a third radial dimension, said axial dimensions of said second electrical winding and said first electrical winding having a first predetermined ratio such that said second electrical winding is free to move in an axial direction over at least a distance of three times said axial displacement, said radial dimensions of said second electrical winding and said first electrical winding having a second predetermined ratio such that said second electrical winding is free to move in a radial direction over at least a distance of 1.5 times said radial displacement, and means coupled to said platform for receiving said electrical power coupled to said second electrical winding while said platform is activated over said axial, radial, angular and rotational displacements, so that said secondary winding is operative within a zone of uniform flux linkages wherein the axial and radial forces are of negligible magnitude.

2. The apparatus as set forth in claim 1, said toroidal core further comprised of axially aligned cylindrical inner and outer ferromagnetic rings, and a planar ferromagnetic cover plate and a planar ferromagnetic bottom plate enclosing said rings, said rings, cover plate and bottom plate defining first, second, and third cross-sectional areas respectively, said cross-sectional areas providing equal flux densities within a range of 50%, and said inner and outer rings having a wall thickness inversely proportional to their respective average radii.

3. The apparatus as set forth in claim 1, further comprising a pluralty of non-magnetically permeable support members, each having a first end affixed to said secondary coil, and a second end secured to said platform, for providing displacements of said second electrical winding corresponding to motion of said platform, and for coupling said electrical power to said platform, said cover plate provided with a plurality of circular apertures for receiving ones of said support members therethrough, and for allowing free angular displacement of said secondary coil.

4. The apparatus as set forth in claim 3, wherein said first and second windings are comprised of a conductor having a plurality of conductive strands of predetermined diameters so symmetrically disposed that each strand assumes, to substantially the same extent, a plurality of different possible positions in the cross-section of the conductor, for providing a uniform distribution of current over said cross-section when operative at alternating frequencies within an audio frequency range.

* * * * *